(12) United States Patent
Weyrauch

(10) Patent No.: US 11,667,436 B2
(45) Date of Patent: Jun. 6, 2023

(54) CLOSED-HEAD DRUM WITH LINER, AND METHOD FOR PRODUCING THE SAME

(71) Applicant: MAUSER-WERKE GMBH, Bruehl (DE)

(72) Inventor: Detlev Weyrauch, Kreuzau-Untermaubach (DE)

(73) Assignee: MAUSER-WERKE GMBH, Bruehl (DE)

( * ) Notice: Subject to any disclaimer, the term of this patent is extended or adjusted under 35 U.S.C. 154(b) by 0 days.

(21) Appl. No.: 17/238,136

(22) Filed: Apr. 22, 2021

(65) Prior Publication Data

US 2021/0237936 A1    Aug. 5, 2021

Related U.S. Application Data

(62) Division of application No. 16/334,435, filed as application No. PCT/EP2017/001086 on Sep. 13, 2017, now Pat. No. 11,014,711.

(30) Foreign Application Priority Data

Sep. 23, 2016   (DE) .......................... 202016005920.4

(51) Int. Cl.
  *B65D 25/14*    (2006.01)
  *B65D 8/02*    (2006.01)
  (Continued)

(52) U.S. Cl.
  CPC .............. *B65D 25/14* (2013.01); *B65D 11/08* (2013.01); *B65D 39/086* (2013.01); *B65D 85/70* (2013.01)

(58) Field of Classification Search
  CPC ...... B65D 25/14; B65D 11/08; B65D 39/086; B65D 85/70; B65D 25/16; B65D 39/08;
  (Continued)

(56) References Cited

U.S. PATENT DOCUMENTS 3,757,986 A   9/1973  Eichinger
3,851,788 A   12/1974  Hammes
(Continued)

FOREIGN PATENT DOCUMENTS

FR    2834975 A1    7/2003
WO    WO-9426603 A1    11/1994

OTHER PUBLICATIONS

International Search Report for International Application PCT/EP2017/001086, dated Nov. 28, 2017.
(Continued)

*Primary Examiner* — Kareen K Thomas
(74) *Attorney, Agent, or Firm* — Marshall, Gerstein & Borun LLP

(57) ABSTRACT

The present invention relates to a closed-head drum (10) with inserted thin-walled inliner (22) of multilayer plastic film for storing and transporting liquid or free-flowing filling materials. In order to improve the use of liners in closed-head drums, and to facilitate in particular the handling for the users such as the filling and emptying operators, so as to allow the closed-head drum (10) with liner (22) to be handled in precisely the same way as a closed-head drum without a liner, the present invention provides for the liner surface to adhere, or be adhesively bonded in a detachable manner, to the inner wall of the drum by virtue of a vacuum being created in the intermediate air space between the inner wall of the drum and liner surface and by thermal activation by means of hot air injection into the interior of the inliner.

7 Claims, 3 Drawing Sheets

(51) Int. Cl.
*B65D 39/08* (2006.01)
*B65D 85/00* (2006.01)

(58) Field of Classification Search
CPC ........ B65D 81/027; B65D 81/00; B65D 1/12; B65D 1/16; B65D 1/20; B65D 7/045; B65D 39/0041; B65D 39/082; B65D 2585/30; B65D 2588/00; B65D 90/52; B65D 21/0231; B29D 22/003; B29D 22/006; B29D 30/0654; B67D 1/00–0468
See application file for complete search history.

(56) References Cited

U.S. PATENT DOCUMENTS

| | | | |
|---|---|---|---|
| 3,854,600 A | 12/1974 | Jesevich et al. | |
| 3,871,549 A * | 3/1975 | Kerr | B65D 39/082 285/201 |
| 4,094,432 A * | 6/1978 | Zilbert | B65D 1/16 220/672 |
| 4,426,863 A * | 1/1984 | Gillette | B65D 55/14 70/164 |
| 4,522,047 A * | 6/1985 | Johl | G07C 9/0069 70/278.1 |
| 4,655,060 A * | 4/1987 | Jakubas | B65D 55/14 70/164 |
| 4,788,840 A * | 12/1988 | Wilson, Jr. | B65D 55/14 70/164 |
| 4,993,579 A | 2/1991 | Burchett | |
| 5,075,951 A | 12/1991 | Schurr et al. | |
| 5,199,286 A * | 4/1993 | Jakubas | B65D 39/088 70/164 |
| 5,217,138 A * | 6/1993 | Nichols | B65D 77/06 220/601 |
| 5,413,240 A * | 5/1995 | Hunter | B65D 39/084 220/601 |
| 5,964,367 A * | 10/1999 | Przytulla | B65D 11/06 220/319 |
| 7,040,501 B1 * | 5/2006 | Przytulla | B65D 11/06 220/659 |
| 7,568,585 B2 | 8/2009 | Baughman et al. | |
| 8,371,469 B2 | 2/2013 | Takedutsumi et al. | |
| 8,616,404 B1 * | 12/2013 | Starck | B65D 81/022 220/592.2 |
| 11,149,875 B2 * | 10/2021 | Cressionnie | F16K 35/06 |
| 2002/0050494 A1 | 5/2002 | Rauworth et al. | |
| 2003/0150861 A1 | 8/2003 | Baughman | |
| 2009/0184133 A1 * | 7/2009 | Hasegawa | B67D 7/0261 222/105 |

OTHER PUBLICATIONS

Written Opinion for International Application PCT/EP2017/001086, dated Nov. 28, 2017.

* cited by examiner

CLOSED-HEAD DRUM WITH LINER, AND METHOD FOR PRODUCING THE SAME

This application is a divisional of U.S. patent application Ser. No. 16/334,435 filed Mar. 19, 2019, which is the United States national phase of International Application No. PCT/EP2017/001086, filed Sep. 13, 2017, which claims priority to German Application No. DE 20 2016 005 920.4, filed on Sep. 23, 2016, the entire contents of each of which are hereby incorporated herein by reference in their entireties.

The invention relates to a closed-head drum having an inserted flexible liner having a filling/retrieving connector and an aeration connector, for storing and for transporting in particular hazardous liquid or free-flowing filling materials.

In the case of a closed-head drum equipped with a liner, the liquid filling material does not come into contact with the drum interior, but only with the interior of the liner. In order for used, in most instances valuable, closed-head drums to be reused, a replacement of only the used, comparatively low-cost, liner or film bag, respectively, is required.

The invention is preferably directed toward a specific plastics material closed-head drum, but can in principle also be applied to other plastics material containers such as, for example, lidded drums having 2 bungs in the drum lid, small drums having lateral handgrips, or canisters having an upper handle.

The closed-head drum from thermoplastic plastics material having an inserted liner composed of a thin-walled plastics material film comprises a cylindrical drum wall, a disk-shaped lower base, and a disk-shaped upper base in which two identically-sized bung connectors which are closable by means of a bung closure are disposed, wherein the one bung connector is configured as a filling and retrieval bung connector, and the other bung connector is configured as a ventilation and aeration bung connector, one respective filling and retrieval liner connector and one ventilation and aeration liner connector of the liner being in each case fastened in said bung connectors. The bung closure for the ventilation and aeration bung connector herein is configured in multiple parts and has at least one adapter ring, and a union or ring nut which encloses, or engages across, respectively, the adapter ring, which are in each case both provided with one centric passage opening, and furthermore has a centric bung plug which is screw-fitted into the centric passage opening of the adapter ring. The adapter ring is fixedly welded to the upper end of the ventilation and aeration bung connector of the liner, and by way of a flange ring of the screw-fitted ring nut is fixed in the ventilation and aeration bung connector of the closed-head drum.

BACKGROUND

In the selection of the packaging, for example in the case of a closed-head drum having an inserted multi-layer liner, the barrier properties of the liner that are required for the respective filling material have to be chosen for different liquid filling materials. A sensitive liquid filling material can be affected and damaged by diffused oxygen, for example. However, multi-layered inliners with barrier properties are comparatively expensive and have only a low shock-tear resistance. Said multi-layer liners, on account of permanent alternating dynamic stresses, such as arise constantly during the transport of liquid containers on account of the filling material sloshing back and forth and which lead to the liner film suspended only from the liner connectors constantly moving in the air space above the liquid filling material column, can easily become leaky at creases or tear in particular in the region of the liner connectors.

Containers having an inserted plastics material liner for avoiding contact between the filling material and the container internal wall are known per se. Publication U.S. Pat. No. 4,993,579 A discloses a container composed of a substantially rigid sheathing and a liner in the form of an elastic bladder which when filled can fill the volume of the surrounding packaging. In order to prevent that the bladder when emptying the container moves in front of the emptying opening and impedes the emptying, the bladder is fixed at a point of the sheathing that is spaced apart from the opening. The elastic bladder when filling can largely fill the interior of the container. The proximity of the bladder to the container external walls enhances the stability. Such a construction is not suitable for multi-layer films having barrier properties, said multi-layer films typically not being so elastic that said multi-layer films when filling sufficiently come to bear on the container external walls.

WO 94/26 603 A1 describes a closed-head drum/liner combination in which an additional assembly opening of at least 80 mm is required. This is thus not a standard package which can readily be used on the existing filling systems and pumping systems. The additional opening which does not correspond to the standard is associated with increased costs. Moreover, a further potential leakage of the surrounding packaging is thus implemented.

The liner here is not fixed to the drum internal wall. Thus, in the use of a multi-layer liner having barrier properties, there would here also be the risk of leakages at creases, or cracks in the region of the liner connector, respectively, due to the alternating dynamic stresses during transport, on the one hand, and the low shock-tear resistance of said liners, on the other hand.

Finally, the use of a cylindrical liner from a thin plastics material film in a closed-head drum having a filling and retrieval bung connector and a ventilation and aeration bung connector in the upper base is known from publication U.S. Pat. No. 5,217,138. The focus herein is on the fixing of the two liner connectors in the bung connectors of the closed-head drum. A liner connector is provided with a welded annular sleeve, or an adapter ring, respectively, which is inserted from above into the ventilation and aeration bung connector of the drum and fixed therein. The rolled-up liner also has to be incorporated in the drum interior through said bung connector. After the insertion of the liner, the drum has to be rolled back and forth until the second liner connector by means of a wire or the like can be fished out through the opposite drum bung connector and be fastened thereto by tight clamping. The liner thereafter hangs limply on the two liner bung connectors in the drum. The intermediate air space between the liner and the drum internal wall cannot be ventilated after the liner has been inserted, unless the drum body has a further closable bung connector, or a further closable drum opening, respectively at any other location. When filling the closed-head drum through the filling and retrieval bung connector, a small bung plug that is disposed centrically in the annular sleeve in the opposite ventilation and aeration bung connector can be unscrewed so that the air displaced by the filling material can escape from the interior of the liner. When filling the drum, a further separate ventilation opening which guarantees a rapid ventilation has to be provided for the escape of intermediate space air, it can otherwise easily arise that the drums overflow in automatic filling systems because the envisaged filling material quantity cannot make its way fast enough into the drum.

GENERAL DESCRIPTION

The present invention is based on the object of alleviating the stated disadvantages of the prior art and of equipping an existing standard closed-head drum with a replaceable liner in such a manner that the users such as, in particular, the filling and emptying operators, do not notice any difference and any disadvantages in the handling as compared to an identical standard closed-head drum without a liner, and the closed-head drum equipped with the liner can be used on the existing filling systems and pumping systems without any kind of additional measures.

The proposed technical teaching imparts in a manner that is simple per se how the disadvantages of known closed-head drums having a liner can be overcome and the handling of the drum equipped with a liner for the filling and emptying operator does not differ in any manner from the handling when using normal drums.

This is achieved in terms of construction by the following features:

both bung connectors are configured as standardized 2" bung connectors having an internal thread (BCS 70×6 closure) and a sealing bed lying therebelow;

the bung closure for the filling and retrieval bung connector is configured as a commercially available standardized 2" bung plug having an external thread (BCS 70×6 closure) and a sealing ring lying therebelow, said sealing ring sealing against the sealing bed in the filling and retrieval bung connector;

the filling and retrieval bung connector, below the internal thread at the tightest passage point of said filling and retrieval bung connector in the connector neck, has a smoothed, annular flat weld bed inner surface to which the upper end of the filling and retrieval liner connector of the liner is fixedly welded;

the bung plug screw-fitted into the centric passage opening of the adapter ring is configured as a commercially available standardized ¾" bung plug having an external thread and a sealing ring lying therebelow;

the flange ring engaged across by the screw-fitted ring nut, of the adapter ring, on the lower side thereof, on the external periphery has a circumferential sealing ring, and seals the drum interior against the sealing bed below the internal thread in the ventilation and aeration bung connector.

In a design embodiment of the invention it is provided that that the screw-fitted ring nut from above is covered by a snap-fitted or clinch-fitted safety cap which is likewise provided with a centric passage opening and by way of said passage opening permits free access to the ¾" bung plug that is screw-fitted so as to be centric in the adapter ring.

This constructive design embodiment of the invention provides that in the case of a released or unscrewed ring nut, respectively, the adapter ring, conjointly with its circumferential sealing ring on the underside of the flange ring, and including the tightly screw-fitted centric ¾" bung plug, is configured so as to be capable of being lifted upward by means of an engaging pulling tool that is guided through a vacuum bell jar, and an annular gap is formed between the sealing ring and the sealing bed, through which a vacuum can be drawn in the intermediate air space between the liner surface and the barrel inner wall by means of a vacuum pump connected to the vacuum bell.

The closed-head drum according to the invention is furthermore distinguished in that upon completed vacuum extraction, when the liner surface bears in an almost complete or fully planar manner, respectively, on the drum internal wall, the adapter ring, including the tightly screw-fitted centric ¾" bung plug, by means of the pulling tool that is guided through the vacuum bell jar is guidable downward, and the circumferential sealing ring on the underside of the adapter flange ring is configured so as to be capable of being pressed in a firm and gas-tight manner onto the sealing bed that is disposed in the ventilation and aeration bung connector below the internal thread, and is subsequently permanently fixed in a gas-tight position by the ring nut that is tightly screw-fitted from above. On account of the permanent vacuum in the intermediate air space between the liner and the drum internal wall, the liner film, even in the case of alternating dynamic stresses lasting for a comparatively long time, such as arise constantly during the transport of liquid containers on account of the filling material sloshing back and forth, remains in contact with the drum internal wall as if "suctioned" thereon, and no creases and movements of the liner film in the air space above the liquid filling material column arise. A leaking or tearing of the liner film no longer arises. The liner, on account of the vacuum-fixing of the liner film to the drum internal wall sits in a fully planar manner like a "second skin" on the drum internal wall; on account thereof, the use of low-cost liner film materials with low tearing strength is advantageously also enabled.

In a further design embodiment of the invention it is provided that upon completed vacuum extraction, when the liner surface bears in an almost fully planar manner on the internal surface of the drum internal wall, in the case of an unscrewed 2" bung plug on the filling side and an unscrewed ¾" bung plug on the degassing side, by means of an optionally correspondingly curved blower tube, for example, hot air is blown into the drum interior, or into the interior of the liner, respectively, in particular in the upper region of the drum wall and of the upper base, in such a manner that a thermal activation of the liner film is effected and the external surface of the liner is slightly adhesively bonded to the internal surface of the drum wall. The blowing of the hot air into the interior of the liner for an improved adhesive effect herein is expediently performed at an increased pressure.

In order for the handling of the closed-head drum according to the invention having a liner for the filling and emptying operators not to differ from the handling of an identical closed-head drum without a liner, it is provided according to the invention that the centrically disposed ¾" bung plug, in the case of a tightly screw-fitted ring nut for filling the closed-head drum with liquid filling material in an automatic filling system by means of a pressurized filler pipe and for retrieving the liquid filling material in an automatic emptying system by means of a vacuum suction pipe through the opposite filling and retrieval bung connector, is freely accessible through the safety cap provided with the centric passage opening, and is configured so as to be capable of being unscrewed and screw-fitted again manually by means of a screwdriver tool or automatically by means of a robotic screwdriver, on account of which any inadvertent release of the compressing ring nut and an associated loss of the vacuum is in particular also prevented.

One advantageous particularity of the liner lies in that the liner connectors by way of a radially inwardly directed welded flange periphery are welded from the internal side to the liner wall of the liner upper base and are rolled from the inside to the outside in such a manner that all existing film cutting edges are covered in relation to filling material contact and no film cutting edge, neither the film cutting edge on the welded flange periphery of the welded liner connectors nor the film cutting edge on the internal-side delimitation of the passage openings in the liner wall, comes into contact with the filled liquid filling material. It is ensured on account thereof that no solvent-containing filling materials can come into contact with any film cutting edges, on account of which the adhesive-type adhesion-promoter layers incorporated between the barrier layers could be invaded and dissolved such that a disadvantageous release of the film layers associated with the loss of the barrier properties and a subsequent damage to the filling material could arise in particular in the case of close-head drums equipped with multi-layered liners transported over a comparatively long time.

The method for producing a closed-head drum according to the invention having a liner is distinguished by the following method steps:

providing a commercially available standard closed-head drum having two 2" bung connectors having 70×6 closures, and a commercially available 2" bung plug for a 70×6 closure, and a commercially available ¾" bung plug for a 70×6 closure, wherein the one 2" bung connector having the 2" bung plug serves as a filling and retrieving bung for the liquid filling material, and the other 2" bung connector serves as a ventilation and aeration bung for the filling volume in the interior of the liner and for the intermediate air space between the external surface of the liner and the drum internal wall;

providing a liner having two dissimilarly sized liner bung connectors, wherein the larger bung connector is provided for the 2" bung connector having the 70×6 closure and is configured so as to be somewhat longer and so as to have a free end that is welded shut, while a hollow sleeve-type adapter ring having a lower sealing ring is welded to the end of the shorter, somewhat smaller, bung connector;

rolling up the liner so as to form a slim roll, wherein the welded adapter ring is disposed on the top of the roll;

inserting the slim roll through the ventilation and aeration bung and fixing the adapter ring by means of a ring nut which encircles the adapter ring and which has a centric passage opening and which has an external thread for the 70×6 closure in the 2" bung connector of the ventilation and aeration bung, wherein the adapter ring with lower sealing ring seals the intermediate air space between the external surface of the liner and the drum internal wall in the 2" bung connector;

blowing compressed air into the ventilation and aeration bung until the liner is fully inflated and the welded-shut larger liner bung connector pokes out of the opposite filling and retrieving bung;

cutting off the welded-shut free end of the larger liner bung connector, and inverting the liner bung connector toward the outside, over the 2" bung connector of the closed-head drum;

radially welding the liner connector below the internal thread in the 2" bung connector and cutting off the surplus or projecting liner connector, respectively, to an exact fit above the annular welding surface below the internal thread;

placing a vacuum bell jar onto the ventilation and aeration bung and, with a released ring nut and a lifted adapter ring, by means of a vacuum pump that is connected to the vacuum bell jar suction all of the air from the intermediate air space between the external surface of the liner and the drum internal wall, and extracting a vacuum until the internal surface of the liner bears in a fully planar manner on the drum internal wall;

tightening the ring nut and compressing the adapter ring with lower sealing ring in the 2" bung connector, for permanently maintaining the vacuum between the liner and the drum internal wall;

screw-fitting the 2" bung plug into the 2" bung connector of the filling and retrieving bung, and screw-fitting the ¾" bung plug into the sleeve-type adapter ring provided with an internal thread.

In order to reliably prevent any unintentional release or unscrewing of the ring nut and an associated loss of the vacuum, a safety cap with a centric passage opening which permits free access to the centric ¾" bung plug is placed onto the 2" bung connector.

In an expedient design embodiment of the method according to the above method steps it is provided that during the extraction of the vacuum through the ventilation and aeration bung connector, compressed air is blown through the opposite filling and retrieval bung connector into the interior of the liner such that the liner film of the liner, in particular in the upper base region about the depressed connector housings, is pushed in a fully planar manner onto the internal wall of the closed-head drum and all of the intermediate space air is squeezed out. In this case, the blown-in compressed air is blown in as hot air for thermally activating the liner film, so that the external side of the liner film develops an adhesive effect and adheres to the internal wall of the closed-head drum, or sticks thereto in a detachable manner, respectively.

In terms of recycling used closed-head drums with liners, it is very advantageous for the reconditioning operations when for retrieving the liner from the drum interior, with a released ring nut and a lifted adapter ring, compressed air is blown through the annular gap between the adapter sealing ring and the bung-connector sealing bed, for example by means of a vacuum bell jar placed thereon and a compressed air line connected thereto, into the intermediate air space between the liner surface and the drum internal wall, such that the liner surface that adheres to the drum internal wall, or is adhesively bonded thereto, respectively, is released. A vacuum in the interior of the liner herein is expediently extracted through the filling and retrieval bung connector, for example by means of a vacuum bell jar place thereon, until said liner has been fully released from the internal wall.

The liner connector welded in the filling and retrieval bung connector is then simply first cut off directly below the annular welding surface and is pulled out somewhat from the bung connector and is tightly closed, for example by means of a weld, on account of which any contamination of the drum interior is avoided. The entire liner conjointly with the adapter ring is thereafter pulled out of the drum interior through the opposite ventilation and aeration bung. A new liner can be immediately inserted and fixed after calibrating the annular welding surface in the filling and retrieving bung for the radial welding of the larger liner connector.

Used containers for the transportation of liquids such as for example, pallet containers, closed-head drums, and canisters, are expertly prepared in qualified reconditioning operations for re-use, this including in particular cleaning, testing, quality controlling, as well as the inserting of new liners. When the flexible thin-walled filling and retrieval connector of the liner in a closed-head drum is fixedly welded into the stable filling and retrieval connector of the stable plastics-material closed-head drum connector, this fixing of the liner in the closed-head drum is the easiest in terms of handling for the customers and users, thus the filling and emptying operators of the liquid filling material, since no twisting of the flexible filling and retrieval connector of the liner, causing creases and leakages, can result in the screw-fitting and unscrewing of screw caps, bung connectors, retrieval fittings, or agitator tools, as has often arisen to date in the case of the usual fastening of liner connectors by way of simple inversion and jamming on the rigid container connectors. In order for the drum interior, or the liner interior, respectively, to be ventilated, the centrally disposed ¾" bung plug has only to be unscrewed (from the adapter ring) at the opposite ventilation bung, as has been commonplace to date.

BRIEF DESCRIPTION OF THE DRAWINGS

The invention will be explained and described in more detail hereunder by means of an exemplary embodiment schematically illustrated in the drawings in which.

DETAILED DESCRIPTION

Figure 1:
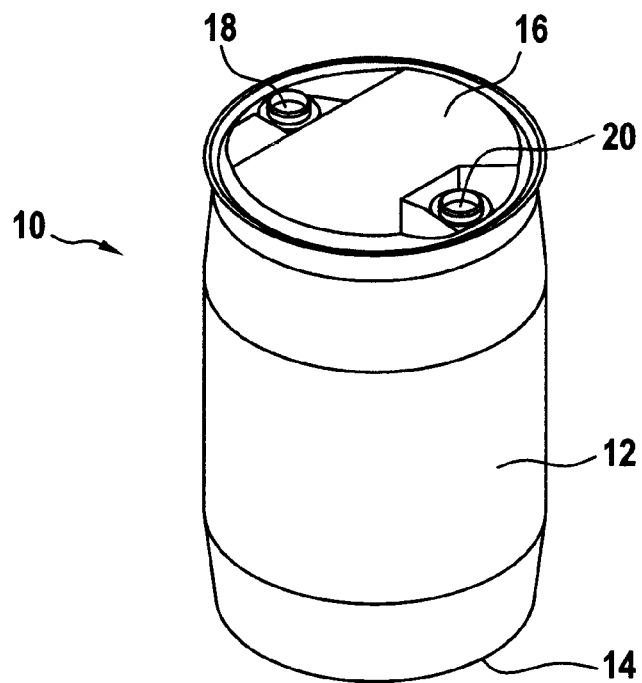
FIG. 1 shows a closed-head drum according to the invention having an inserted liner in a perspective view.

As a preferred exemplary embodiment a closed-head drum from thermoplastic plastics material, which is equipped with an inserted liner 22 composed of a thin-walled plastics-material film, is identified by the reference sign 10 in FIG. 1. As mentioned, the invention could likewise be applied to other plastics-material containers such as canisters, small drums, lidded drums having bung lids, or pallet containers.

For the application, or use, respectively, with hazardous filling materials the closed-head drum 10 meets particular testing criteria and is provided with a corresponding official certification. The closed-head drum 10 in a mostly used volumetric size of 220 l is particularly suitable for chemical products as well as for foodstuffs. The main components of said closed-head drum 10 are a cylindrical drum wall 12, a disk-shaped lower base 14, and a disk-shaped upper base 16 in which two identically-sized bung connectors 18, 20 which are closable by means of a bung closure are disposed. Closed-head drums of this type have a height of approx. 935 mm and a diameter of approx. 581 mm, are preferably produced by the blow-molding method, and are typically composed of HDPE plastics material. The drum weight is approx. 8.2 kg. Modern drums are composed of three layers, wherein only a thin external layer (20%) is dyed blue and a thin ultrapure inner layer (20%) is composed of new material, while the central support layer (60%) is composed of recycled granules, that is to say from used regenerated plastics material.

In the case of the closed-head drum 10 according to the invention, the one bung connector is configured as a filling and retrieval bung connector 18, and the other bung connector is configured as a ventilation and aeration bung connector 20. Both bung connectors are configured as 2" bung connectors having a BCS 70×6 screw fitting.

A filling and retrieval connector 24 and a ventilation and aeration connector 26 of the liner 22 are fastened so as to be correspondingly assigned in said drum bung connector.

Figure 2:
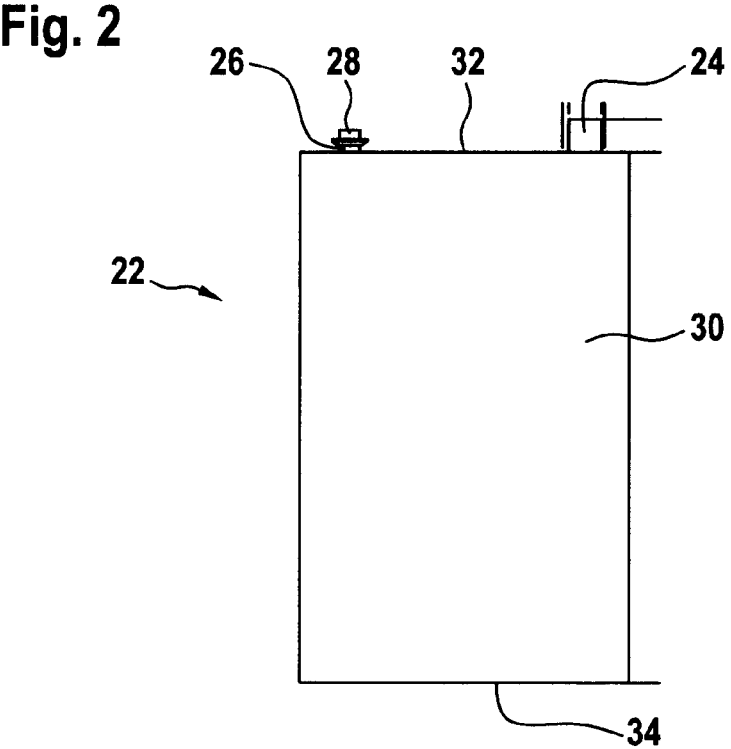
FIG. 2 shows the inserted liner for the closed-head drum according to FIG. 1 in a side view.

The liner 22 is illustrated in a side view in FIG. 2. The shape of said liner 22 is adapted to the internal wall of the drum and is composed of a cylindrical liner wall 30, a disk-shaped liner upper base 32, and a disk-shaped liner lower base 34. The liner connector 24, which in terms of the diameter is configured so as to be somewhat larger and longer, for the liner connector 26 of the closed-head drum is disposed at the corresponding position in the upper base 32 of the liner 22, and the somewhat smaller and shorter liner connector 26 for the ventilation and aeration bung connector 20 of the closed-head drum 10 is disposed opposite thereto. An adapter ring 28 which is inserted into the ventilation and aeration bung connector 20 is welded to the shorter liner connector 26.

The flexible liner connectors 18, 20 herein are produced from the same film material having the same barrier properties as the film material of the flexible liner 22, so as to preclude any disadvantageous diffusion processes that penetrate the plastics material. In the case of a multi-layered asymmetrical film construction of the liner film it is important that the same film material, or the same external film layer, respectively are welded to one another in the annular welding of the welded flange periphery of the liner connectors to the liner wall.

The liner 22 for a filling volume of 220 l has a height of approx. 930 mm and a diameter of approx. 580 mm. The diameter for the smaller liner connector 26 is approx. 25 mm, and approx. 58 mm for the liner connector 26 that is configured so as to be larger and longer. The liner per se, by virtue of the thin-walled configuration thereof, is not dimensionally stable but very flexible, compliant, and adaptable. The wall thickness of the multi-layered liner composite film is approx. 100 µm to 300 µm, preferably approx. 150 µm. At an area weight of approx. 100 to 150 g/m$^2$ a material weight of approx. 0.15 to 0.3 kg results for a 220 l liner bag. The wafer-thin composite layers herein can be composed of various materials such as, for example, HDPE/LDPE/EVOH/PET/PA/PP or SiOx, having layers of adhesion promoters disposed therebetween, and/or be provided with a glass-fiber or woven-fabric reinforcement. Depending on the specific application, the composite film is equipped with barrier layers, for example in relation to the diffusion of hydrocarbons, oxygen, aromatic substances, or water vapor, and is optionally provided with an antiseptic antibacterial coating or a silver-containing or aluminum-containing vapor-deposited metallized film.

In terms of construction, the liner connectors 24, 26, by way of a radially inwardly pointing welded flange periphery are welded from the internal side to the liner wall of the liner upper base 32 and thereafter are rolled from the inside to the outside in such a manner that all existing film cutting edges are covered in relation to filling-material contact and no film cutting edge, neither the film cutting edge on the welded flange periphery of the welded liner connectors 24, 26 nor the film cutting edge on the internal-side delimitation of the passage openings in the liner wall, comes into contact with the filled liquid filling material. On account thereof, the full barrier properties are fully preserved even in the case of long transportation and storage periods of the closed-head drums, and any damage to sensitive filling materials caused by diffusion is avoided.

In order for the particular liner to be implemented, it is in any case important that the annular welding of the two welded flange peripheries of the liner to the internal wall of the liner upper base in terms of production technology has been performed prior to the complete and final welding of the blanks of the multi-layered liner film for the closed liner body, otherwise welding of the film connectors from the inside to the internal wall of the liner upper base is no longer.

Figure 3:
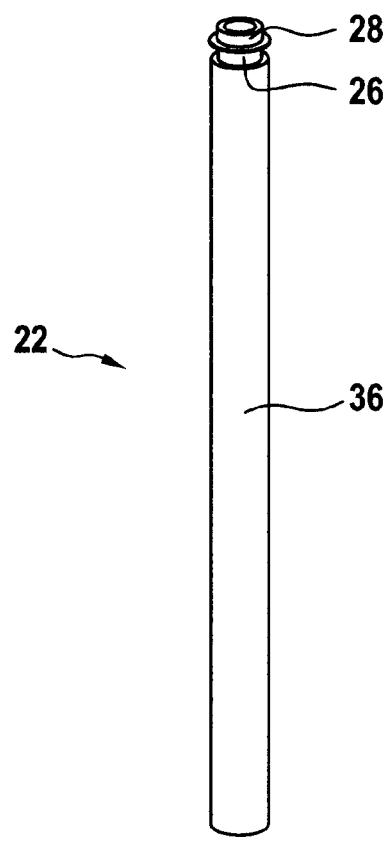
FIG. 3 shows the rolled-up liner prior to being inserted into the closed-head drum in a side view.

In order for the liner 22 from a flexible thin-walled multi-layered film to be able to be incorporated in the drum interior, said liner 22 is rolled up so as to form a slim rod-shaped roll 36, as can be seen in FIG. 3. Here, at the upper end the smaller liner connector 26 protrudes with the welded-on adapter ring 28, while the larger liner connector 24 is also rolled up and is not visible here. As an important feature pertaining to the blank of the liner, the liner connector 24 having the larger diameter, prior to insertion into the closed-head drum 10, has a length of at least double the diameter of said liner connector 24, and at the free end thereof is welded shut or is closed in a gas tight manner, respectively.

The liner roll 36 is guided through the ventilation and aeration bung connector 20 of the closed-head drum 10, and the adapter ring 28 is fastened in the bung connector 20 as will be explained in more detail hereunder. Once the adapter ring 28 has been fastened in the ventilation and gassing bung connector 20, compressed air is slowly blown through the hollow adapter ring 28 in the smaller liner connector 26 into the liner such that the latter unfolds and is completely inflated until the opposite larger liner connector 24, still welded shut, in a self-acting manner pokes from below out of the associated filling and retrieval bung connector 18 of the closed-head drum 10.

Figure 4:
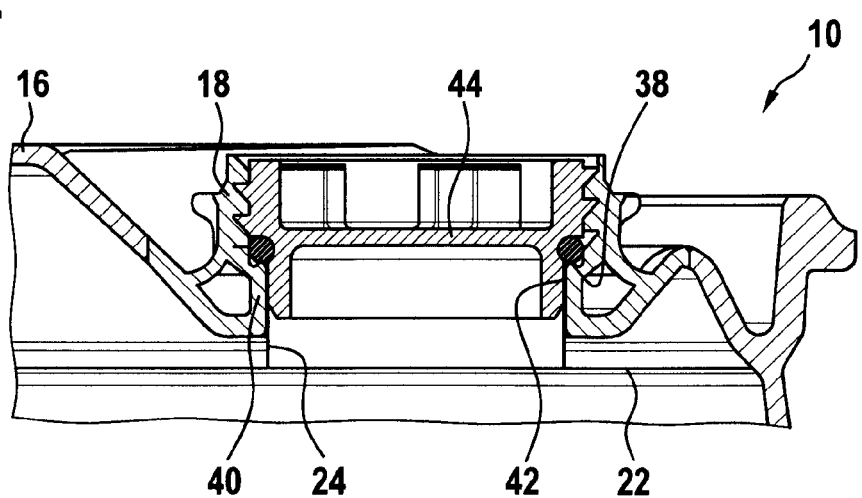
FIG. 4 shows a sectional part-view about the upper region of the plastics-material closed-head drum having a 2" bung connector and a welded liner connector.

The upper region of the closed-head drum 10 having the filling and retrieval bung connector 18 for a BCS 70×6 standard closure is illustrated in FIG. 4. The 2" bung connector 18, like the bung connector 20 embodied in the same manner, has an internal thread that is configured as a coarse thread; a sealing bed 38, which tapers in terms of diameter, for the sealing ring sitting on the 2" bung plug 44 is situated directly below the internal thread. The filling and retrieval bung connector 18 below the internal thread has a connector neck 40, reduced in terms of diameter, having an annular internal surface 42 as a weld bed surface for the 2" liner connector to be welded therein. The annular internal surface 42 in the connector neck 40 as a weld bed surface is configured so as to be smoothed. The smoothing performed for calibrating the internal surface 42 is performed, for example, by means of a honing tool, a reamer, or a scraper, expediently in an overhead positioning of the drum, wherein peeled plastic-material particle droppings can be suctioned downward; optionally, compressed air is simultaneously blown into the drum body through the other bung connector 20 such that it is in any case precluded that peeled plastics-material particles can make their way into the drum body.

When the liner 22 is inserted into the closed-head drum 10 and is inflated in such a manner that the liner connector 24, still welded shut, pokes out of the bung connector 18, the liner connector 24 is pulled so as to be taut, is cut open at the top, and inverted over the bung connector 18. The liner connector 24, by means of an expansion welding method, in the radial direction is then welded tightly to the annular internal surface 42 (weld bed surface) and is cut off for an exact fit such that a commercially available 2" bung plug 44 can be screw-fitted and by means of the sealing ring thereof can seal in relation to the sealing bed 38 disposed at the lower end of the internal thread, or the seal counter bearing directly above the weld bed surface, respectively. Apart from calibrating the weld bed surface, no measures or adaptations whatsoever are performed on the standard closed-head drum 10. The advantageous handling of the user-friendly closed-head drum having a liner according to the present invention is very substantially implemented by the particular constructive design embodiment and functional mode of the insert for the aeration and ventilation bung connector 20.

Figure 5:
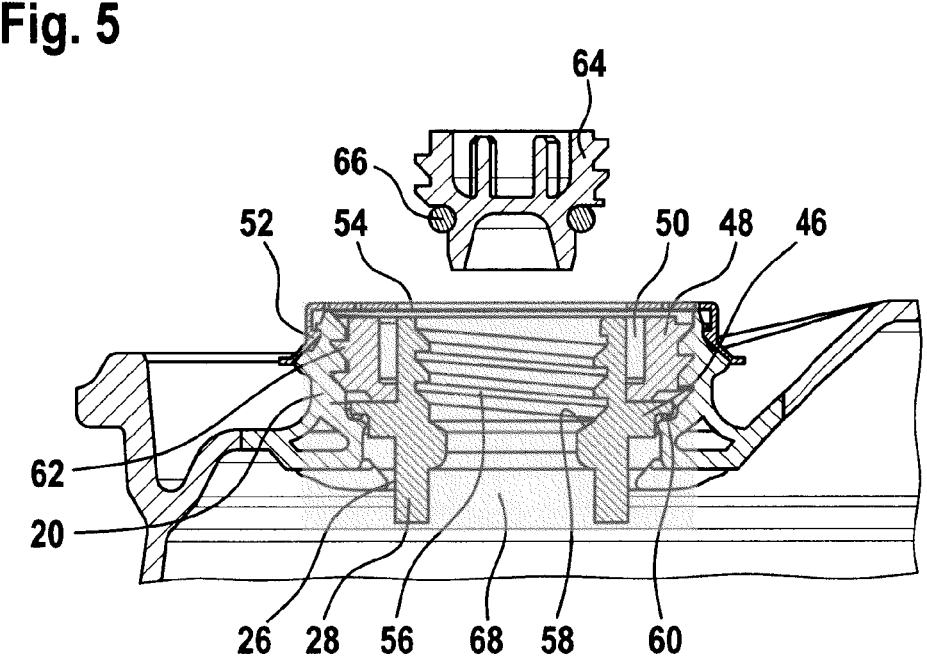
FIG. 5 shows a sectional part-view of a ventilation and gassing bung connector having an unscrewed ¾" bung plug.

As is illustrated in FIG. 5, the closure insert for the 2" aeration and ventilation bung connector 20 is composed of at least three parts. The latter are the internally hollow adapter ring 28 having an external radially projecting flange ring 46 which is disposed so as to be approximately centric, a ring nut 48 which encloses the sleeve-shaped adapter ring 28 above the flange ring 46 and which has an external thread and a central passage opening 50, and a safety cap 52 which externally and from above covers the upper part of the aeration and ventilation bung connector 20 and which has a central passage opening 54.

The hollow sleeve-shaped adapter ring 28 in the upper region of the passage opening thereof is equipped with an internal thread 56. The internal thread 56, conceived as a coarse thread, at the lower end is provided with a sealing bed 58 that is reduced in terms of the diameter.

A circumferential sealing ring 60 which is preferably configured as a rectangular flat seal and within the bung connector 20, as is the case in the opposite bung connector 18, seals in relation to the sealing bed at the lower end of the internal thread above the diameter-reduced connector neck, is disposed externally on the lower side of the flange ring 46 of the adapter ring 28. The upper side of the flange ring 46 of the adapter ring 28 is impinged from above by the ring nut 48 that encloses the upper region of the adapter ring 28, whose external thread 62, conceived as a coarse thread, engages in the internal thread of the bung connector 18 and presses the sealing ring 60 of the adapter flange ring 46 against the sealing bed (38) at the lower end of the internal thread of the connector 20. The tubular liner connector 26 below the flange ring 46 is welded radially from the outside to the annular-sleeve-type adapter ring 28.

A smaller ¾" bung plug 64 which by way of the sealing ring 66 thereof seals in relation to the sealing bed 58, reduced in terms of the diameter, of the internal thread 56 is screw-fittable from above into the internal thread 56, conceived as a coarse thread, of the adapter ring 28. When the liner 22 is inserted into the drum body and both liner bungs are fastened in the bung connectors of the drum, the ring nut 48 is firmly tightened so that the sealing ring 60 is pressed in a gas-tight manner against the sealing bed 58 in the bung connector 20, and the intermediate air space between the liner and the drum internal wall is closed in a completely air-tight manner. Thereafter, the safety cap 52 with the central passage opening 54 is placed from above onto the aeration and ventilation bung connector 20, wherein the latter is enclosed on the outside in its upper region. The safety cap 52 is preferably configured as a thin-walled plastics-material cap having a releasable or non-releasable snap-fit/latch-fit closure and serves for protecting the ring nut 48 for fixing the adapter ring 56 from unintentional or inexpert opening and for permitting only one access to the ¾" ventilation plug 38×6 which has to be able to be opened when filling and emptying the closed-head drum.

In the case of a further embodiment, the safety cap 52 is configured as a thin sheet-metal lid with a central passage opening 54, which is non-releasably clinch-fitted and which is additionally covered by a thin-walled closed plastics-material protective cap or seal cap, respectively, having a releasable snap-fit/latch-fit closure. The additional seal cap herein is provided as protection against dirt and rainwater and for unscrewing the ¾" bung plug can be easily removed, while the non-releasably placed sheet-metal lid with the passage opening in any case prevents any inadvertent or unauthorized unscrewing of the ring nut and can only be removed using a corresponding tool in the recycling operations.

In the case of this embodiment of the aeration and ventilation bung 20, a smaller 38×6 closure is thus inserted between the adapter internal thread and the ¾" bung-plug external thread between the bung-connector internal thread and the ring-nut external thread.

Figure 6:
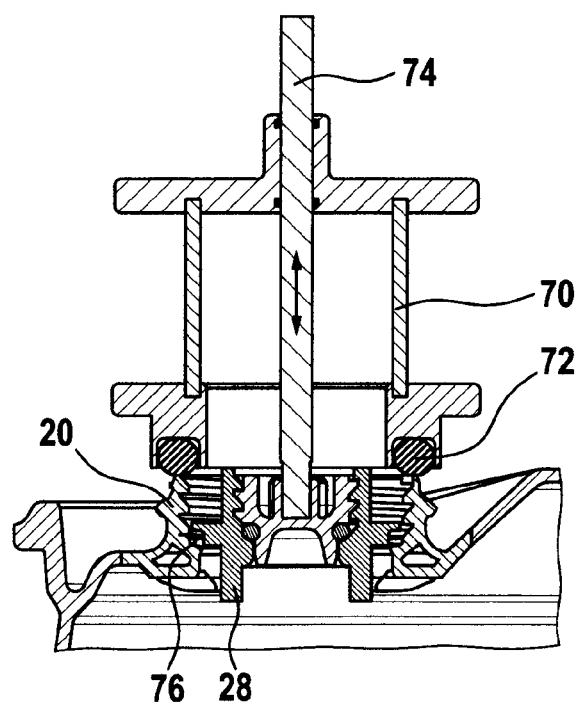
FIG. 6 shows a further sectional part-view about the region of the ventilation and gassing bung plug, having a vacuum bell jar placed thereon.

In order for the functioning mode of the closed-head drum 10 according to the invention to be highlighted, it is illustrated in FIG. 6 how a vacuum bell jar 70 having a sealing ring 72 is placed onto the aeration and ventilation bung 20 in order for the intermediate air space between the liner surface and the drum internal wall to be vacuumed. A rod-shaped pulling tool 74 which can be moved up and down, as is indicated by a double arrow, is disposed centrically in the vacuum bell jar 70. The pulling tool 74 at the bottom latches into the ¾" bung plug 64 that is tightly screw-fitted into the adapter ring 28. When the ring nut 48 is released or unscrewed, the bung plug 64 together with the adapter ring 28, is slightly lifted by means of the pulling tool 74, such that the seal 60 on the flange ring 46 of the adapter ring 28 is somewhat lifted from the sealing bed 38 in the bung connector 20 and releases an annular gap 76 through which the interfering intermediate air is fully extracted from the intermediate air space between the liner and the drum internal wall. Upon completion of this procedure, the ring nut 48 is screw-fitted and firmly tightened in order for the vacuum to be permanently preserved. On account thereof, the adapter ring 28 by way of the lower sealing ring 60 is tightly pressed onto the sealing bed 38 in the bung connector 20. Thereafter, a safety cap 52 with a centric passage opening 54, which permits free access to the ¾" bung plug 64 for the filling and emptying operators, is also placed onto the 2" bung connector 20. The safety cap 52 is intended to prevent any inadvertent releasing or unscrewing of the ring nut and the associated loss of the vacuum. A usual thin plastics-material snap-fit lid for protection against dirt and rainwater can also be snap-fitted over the safety cap 52, or onto the 2" bung connector 20, respectively.

In the case of the present invention, the liner 22 bears in a fully planar manner like a second skin on the internal surface closed-head drum 10, so as to be adapted to the shape thereof. A substantial advantage of such a second-skin liner lies in that the film bag does not as has been usual to date require such a high tear resistance in relation to wobbling when filling, or in the back-and-forth sloshing of the liquid filling material in transportation movements, since no movement whatsoever of the liner film material occurs herein, because the latter bears firmly and permanently on the internal side of the closed-head drum 10, or is adhesively bonded thereto so as to be detachable, respectively. As a result, it is also possible to use lower-cost tear-sensitive film materials having high barrier properties than previously.

The present invention does not represent a complicated new construction of a closed-head drum but, in the case of a standard closed-head drum having a liner, rather in a phenomenal manner enables vacuuming of the harmful intermediate air between the liner and the drum internal wall directly after the insertion of the liner, on the one hand, and ventilating the drum interior when filling or aerating the drum interior through one and the same bung connector when removing the filling material, on the other hand. Since this solution is conceived for a known closed-head drum type having two 2" bungs, as is widely commercially used, not only newly produced closed-head drums but all other used closed-head drums of this type existing in the market can also be provided with a new liner and be rendered useful for re-use.

| | |
|---|---|
| 10 | Plastics-material closed-head drum |
| 12 | Cylindrical drum wall (10) |
| 14 | Disk-shaped lower base |
| 16 | Disk-shaped upper base |
| 18 | Filling and retrieval bung connector (10) |
| 20 | Degassing and gassing bung connector (10) |
| 22 | Liner (film bag) |
| 24 | Filling and retrieval liner connector (22) |
| 26 | Degassing and gassing liner connector (22) |
| 28 | Adapter ring (26) |
| 30 | Cylindrical internal wall (22) |
| 32 | Disk-shaped liner upper base (22) |
| 34 | Disk-shaped liner lower base (22) |
| 36 | Liner roll (22) |
| 38 | Sealing bed (18) |
| 40 | Connector neck (18) |
| 42 | Weld bed internal surface (40) |
| 44 | 2" bung plug (18) |
| 46 | Flange ring (28) |
| 48 | Ring nut |
| 50 | Passage opening (48) |
| 52 | Safety cap |
| 54 | Passage opening (52) |
| 56 | Internal thread (28) |
| 58 | Sealing bed (56) |
| 60 | Sealing ring (46) |
| 62 | External thread (48) |
| 64 | ¾" bung plug |
| 66 | Sealing ring (64) |
| 68 | Passage opening (28) |
| 70 | Vacuum bell jar |
| 72 | Sealing ring (70) |
| 74 | Pulling tool (70) |
| 76 | Annular gap |

The invention claimed is:

1. A method for producing a closed-head drum having a liner including a cylindrical internal wall, a disk-shaped lower base, and a disk-shaped upper base in which two liner connectors are disposed, wherein one liner connector has a larger diameter than the other liner connector and serves as a filling and retrieval connector, and the other liner connector serves for ventilation and aerating when filling or emptying, respectively, the liner and the closed-head drum with liquid filling material, wherein an upper end of a bung connector having a smaller diameter is fixedly welded to an adapter ring which has a radially projecting flange ring, a circumferential sealing ring being disposed on, or fastened to, respectively an underside of said flange ring, the method for producing a closed-head drum characterized by following method steps:

providing a commercially available standard closed-head drum having two 2" bung connectors having 70×6 closures, and a commercially available 2" bung plug for a 70×6 closure, and a commercially available ¾" bung plug for a 70×6 closure, wherein one 2" bung connector having the 2" bung plug serves as a filling and retrieving bung for the liquid filling material, and another 2" bung connector serves as a ventilation and aeration bung for filling volume in an interior of the liner and for an intermediate air space between an external surface of the liner and a drum internal wall;

providing a liner having two dissimilarly sized liner bung connectors, wherein the larger bung connector is provided for the 2" bung connector having the 70×6 closure and is configured so as to be longer and so as to have a free end that is welded shut, while a hollow sleeve-type adapter ring having a lower sealing ring is welded to an end of a shorter, smaller bung connector;

rolling up the liner so as to form a slim roll, wherein the welded adapter ring is disposed on a top of the roll;

inserting the slim roll through the ventilation and aeration bung and fixing the adapter ring by means of a ring nut which encircles the adapter ring and which has a centric passage opening and which has an external thread for the 70×6 closure in the 2" bung connector of the ventilation and aeration bung, wherein the adapter ring with the lower sealing ring seals the intermediate air space between the external surface of the liner and the drum internal wall in the 2" bung connector;

blowing compressed air into the ventilation and aeration bung until the liner is fully inflated and the welded-shut larger liner bung connector pokes out of an opposite filling and retrieving bung;

cutting off the welded-shut free end of the larger liner bung connector, and inverting the liner bung connector toward an outside, over the 2" bung connector of the closed-head drum;

radially welding the liner connector below an internal thread in the 2" bung connector, and cutting off a surplus and/or projecting liner connector to an exact fit above an annular welding surface below an internal thread, placing a vacuum bell jar onto the ventilation and aeration bung and, with a released ring nut and a lifted adapter ring, by means of a vacuum pump that is connected to the vacuum bell jar suction all of the air from the intermediate air space between the external surface of the liner and the drum internal wall, and extracting a vacuum until the external surface of the liner bears in a fully planar manner on the drum internal wall;

tightening the ring nut and compressing the adapter ring with the lower sealing ring in the 2" bung connector, for permanently maintaining the vacuum between the liner and the drum internal wall;

screw-fitting the 2" bung plug into the 2" bung connector of the filling and retrieving bung, and screw-fitting the ¾" bung plug into the adapter ring provided with the internal thread.

2. The method as claimed in preceding claim 1, characterized in that
for secured covering, a safety cap having a centric passage opening is placed onto the 2" bung connector, so as to prevent any unintentional release or unscrewing of the ring nut and an associated loss of the vacuum.

3. The method as claimed in claim 1, characterized in that
during extraction of the vacuum through the ventilation and aeration bung connector, compressed air is blown through the opposite filling and retrieval bung connector into the interior of the liner such that the liner film of the liner is pushed in a fully planar manner onto the internal wall of the closed-head drum and all of the intermediate space air is squeezed out.

4. The method as claimed in claim 1, characterized in that
the blown-in compressed air for thermally activating the liner film is blown in as hot air such that the external side of the liner film develops an adhesive effect and adheres to the internal wall of the closed-head drum or sticks thereto in a detachable manner.

5. The method as claimed in claim 1, characterized in that
for retrieving the liner from the drum interior, with a released ring nut and a lifted adapter ring, compressed air is blown through an annular gap between the adapter sealing ring and the bung-connector sealing bed into the intermediate air space between the liner surface and the drum internal wall, such that the liner surface that adheres to the drum internal wall and/or is adhesively bonded thereto is released.

6. The method as claimed in claim 1, characterized in that
a vacuum in the interior of the liner is extracted through the filling and retrieval bung connector until said liner has been fully released from the drum internal wall.

7. The method as claimed in claim 1, characterized in that
the liner connector welded in the filling and retrieval bung connector is first cut off directly below the annular welding surface and is pulled out somewhat from the bung connector and is tightly closed, and the entire liner conjointly with the adapter ring is thereafter pulled out of the drum interior through the opposite ventilation and aeration bung.

* * * * *